Feb. 14, 1933.                J. ZUBATY ET AL                1,897,975
                      INSTRUMENT PANEL FACE ASSEMBLY
                           Filed June 27, 1931
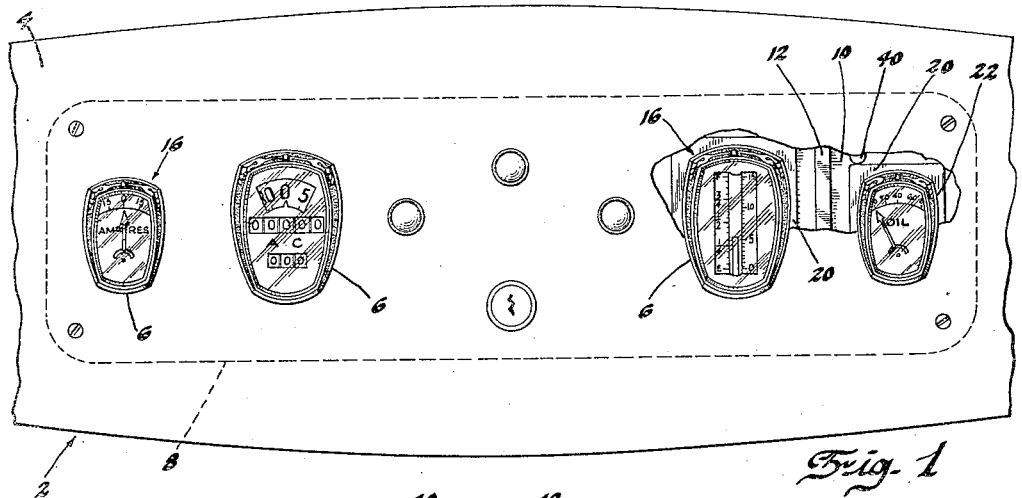
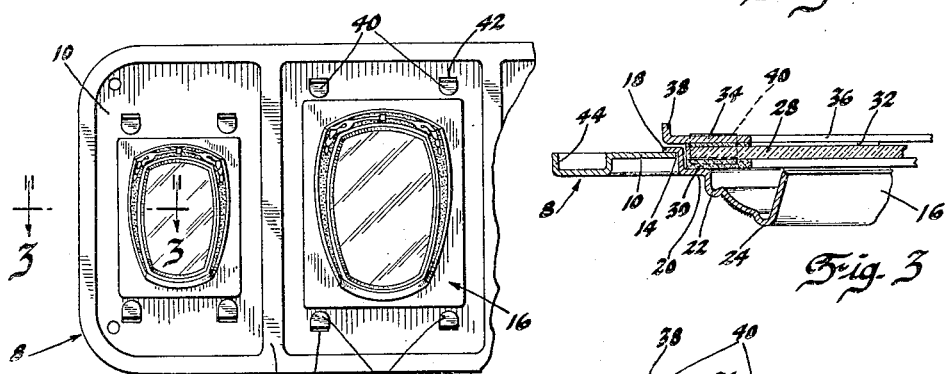
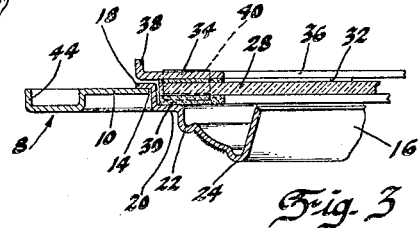
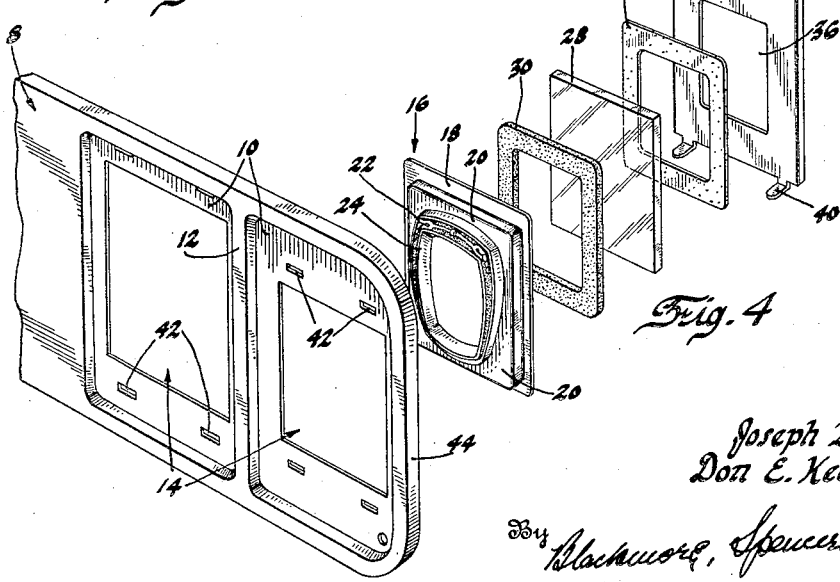
Inventors
Joseph Zubaty &
Don E. Keeney
By Blackmore, Spencer & Hiibi
Attorneys Patented Feb. 14, 1933

1,897,975

UNITED STATES PATENT OFFICE

JOSEPH ZUBATY AND DON E. KEENEY, OF FLINT, MICHIGAN, ASSIGNORS TO A C SPARK PLUG COMPANY, OF FLINT, MICHIGAN, A COMPANY OF MICHIGAN

INSTRUMENT PANEL FACE ASSEMBLY

Application filed June 27, 1931. Serial No. 547,231.

This invention relates to instrument panels and has particular reference to instrument panels used on automotive vehicles.

The principal object of the invention is to produce a supplemental panel which readily can be made from stampings, the various parts interfitting in a final assembly for assembly on the instrument board of an automotive vehicle.

The instrument panel per se comprises a main panel, substantially rectangular in shape, the panel having a plurality of depressions formed therein. An opening is formed substantially at the center of each depression and a bezel is suitably shaped to fit in the opening. The usual glass window is received over the back of the bezel and is spaced by suitable gaskets from the bezel as well as from a holding plate which is placed over the rear of the glass and secured to the panel by means of integral tongues which fit into slots in the panel and are suitably bent over. The plate, of course, is provided with a suitable opening corresponding to the bezel opening.

Referring to the drawing:

Figure 1 is an assembly view showing the novel instrument panel mounted on the instrument board of an automotive vehicle.

Figure 2 is a front view of a portion of the panel.

Figure 3 is a sectional view taken on the line 3—3 of Figure 2.

Figure 4 is an expanded view of the parts of the instrument panel.

Referring to the drawing, the numeral 2 designates an automotive vehicle as a whole. The vehicle has the usual instrument board 4 mounted in front of the driver's seat. The instrument board has a plurality of openings 6 in back of which the novel instrument panel 8 of the invention is mounted.

The panel is provided with a plurality of depressions 10, preferably four in number with two at each end of the panel, symmetrically arranged. A strengthening rib 12 is left between each pair of depressions. At substantially the center of each depression 10 an opening 14 is provided for the reception of a bezel 16. The openings 14 may be of different sizes depending on the instruments to be used. The bezel has a stepped formation, one of the steps 18 fitting against the back of the panel 8, at the edge of the opening 14. A second step 20 projects away from the depression to substantially the plane of the undepressed portion of the panel 8. The bezel has the usual ornamental ribs 22 and 24.

The instrument board 4 has the plurality of openings 6, corresponding in number to the number of openings 14 in the instrument panel, and corresponding in outline to the outline of the ornamental rib 22 of the bezel 16. When the instrument panel 8 is placed on the instrument board, the ribs 22 of the bezel will fit into the instrument board openings and only those portions of the instrument panel within the outlines of the ribs 22 will be visible.

A glass window 28 is placed at the rear of the bezel and a gasket 30 is placed between the bezel and window. A second gasket 32 is placed at the rear of the glass and a plate 34, having a central opening 36, fits over the gasket 32 and glass 28. The plate has the turned over edges 38 to give strength thereto. The plate has the integral tongues 40, preferably four in number, which project through corresponding openings 42 in the depressions 10. The tongues are bent over, as shown in Figure 2, rigidly to hold the bezel and gaskets to the panel.

The instrument panel 8 is preferably provided with the turned over edge 44 to give stiffness to the panel. In final assembly, the panel 8 is crimped over the casings of the various instruments. The instruments and panel are held on the instrument board in any suitable way, not essential to the present invention.

We claim:

1. In an instrument panel, a plurality of depressions in said panel, each of said depressions having an opening therein through which the instrument faces are visible, a bezel in the panel at each opening, a glass window over the bezel, a plate over the glass, said panel having a plurality of openings, and tongues on said plate fitting into said openings in the panel to hold said bezel and glass to the panel.

2. The combination of an instrument board having an opening therein for the display of an instrument, a plate secured at the rear of the panel having a rearwardly pressed portion provided with an aperture alined with the aperture in the panel, a bezel mounted at the rear of the plate having a forwardly projecting stepped portion fitting the aperture in the plate, the forward part of the stepped portion lying in the plane of the plate, said stepped portion being provided with a second forwardly projecting stepped portion fitting the opening in the instrument board.

3. The combination of an instrument board having an opening therein for the display of an instrument, a plate secured at the rear of the panel having a rearwardly pressed portion provided with an aperture alined with the aperture in the panel, a bezel mounted at the rear of the plate having a forwardly projecting stepped portion fitting the aperture in the plate, the forward part of the stepped portion lying in the plane of the plate, said stepped portion being provided with a second forwardly projecting stepped portion fitting the opening in the instrument board, a cover glass at the rear of the plate, means for holding the cover glass to the bezel including securing means extending into the space between the instrument board and the rearwardly pressed portion of the plate.

4. The combination of an instrument board having a plurality of openings therein for the display of instruments, a plate secured to the rear of the board having rearwardly pressed portions provided with apertures alined with the apertures in the panel, a plurality of bezels mounted at the rear of the plate having forwardly projecting stepped portions fitting the apertures in the plate, the forward parts of the stepped portions lying substantially in the plane of the plate, said stepped portions being provided with forwardly projecting stepped portions fitting the openings in the instrument board, and means for securing the bezels to the plate.

In testimony whereof we affix our signatures.

JOSEPH ZUBATY.
DON E. KEENEY.